US006201680B1

(12) United States Patent
Tokatian

(10) Patent No.: US 6,201,680 B1
(45) Date of Patent: Mar. 13, 2001

(54) ADJUSTABLE HIGH-SPEED AUDIO TRANSDUCER PROTECTION CIRCUIT

(76) Inventor: Aram Armen Tokatian, 1531 E. Starpass Dr., Fresno, CA (US) 93720

( * ) Notice: Subject to any disclaimer, the term of this patent is extended or adjusted under 35 U.S.C. 154(b) by 0 days.

(21) Appl. No.: 09/243,027

(22) Filed: Feb. 2, 1999

(51) Int. Cl.[7] .......... H02H 1/00
(52) U.S. Cl. .......... 361/119; 361/58; 361/91.1
(58) Field of Search .......... 381/55; 361/58, 361/111, 118, 119, 91.1, 91.2, 93.4, 93.7; 307/39, 62, 126, 131, 154

(56) References Cited

U.S. PATENT DOCUMENTS

| | | | |
|---|---|---|---|
| 3,890,465 * | 6/1975 | Kaizu | 179/1 VL |
| 3,925,708 | 12/1975 | Picciochi | 361/94 |
| 3,959,735 | 5/1976 | GrosJean | 361/58 |
| 4,093,822 | 6/1978 | Steinle | 361/58 |
| 4,122,507 | 10/1978 | Queen | 361/94 |
| 4,330,686 | 5/1982 | Roe | 361/79 |

OTHER PUBLICATIONS

JBL "Fax Back" Service, Jul. 1992.
"Sound Guard" (Peavey Electronics) No Month, 1998.
"Power Sense" (Community Light/Sound) No Date.

* cited by examiner

*Primary Examiner*—Ronald W. Leja

(57) ABSTRACT

An audio loudspeaker protection circuit used to protect single or multiple array connected audio transducers, and passive audio crossover networks from damage. An audio loudspeaker protection circuit providing protection during power overload, high speed transients, or direct current. This circuit has an adjustable activation control that accommodates broad power ratings for audio transducers, irrespective of the total load impedance. No sound coloration, dynamic range, or frequency response losses are added when implementing this circuit. This is due to high impedance, and low capacitance design. Virtually no power is consumed during normal audio system operation. The circuit is able to activate with any audio or non-audio signal, regardless of signal input polarity. The circuit comprises of several elements consisting of two high-speed rectifier circuits, a threshold detect circuit, a thyristor crowbar circuit, a relay, and a relay coil current regulator.

1 Claim, 4 Drawing Sheets

ADJUSTABLE HIGH-SPEED AUDIO TRANSDUCER PROTECTION CIRCUIT

BACKGROUND

1. Field of Invention

This invention relates to the protection of audio loudspeakers that may be damaged by high-speed audio electrical transients, power overload, or direct current, including any combination thereof, and an electronic circuit used to protect against these types of damages.

BACKGROUND

2. Prior Art

Prior art loudspeaker protection circuits were attempted by various passive methods. Light bulbs, fuses, relays, and special thermistors were used as elements for these types of protection circuits. All of these approaches have limitations and deficiencies, as discussed below.

The earliest method of loudspeaker protection involved the use of a light bulb. This method was rather rudimentary and provided little protection to the loudspeakers. This method uses a light bulb with a specific voltage that would be placed in series with a high-frequency tweeter or compression driver. Unfortunately, this method is limited to protecting the loudspeakers only against power overload. A light bulbs response is too slow for adequate transient protection. Light bulbs also have the disadvantage of eventually burning out, thereby halting sound output until the audio system is serviced. U.S. Pat. No. 4,122,507 to Queen (1978) demonstrates that a light bulb is susceptible to bum out. A bulb's voltage rating can be easily surpassed by an audio signal with large amplitude. Light bulbs have the additional disadvantage of adversely affecting audio quality. As the filament heats up and cools down, sound compression occurs. A further disadvantage of using a light bulb is that its filament is sensitive to damage by vibration. This can occur in an environment such as a loudspeaker cabinet. Because of the inherent problems mentioned in using light bulbs, this element is unreliable.

Fuses are the most common method currently used in protecting loudspeakers. They are used to reduce fire hazards. Fuses, like light bulbs, do not provide a fast enough response to protect loudspeakers from transient damage. Admittedly, fuses protect loudspeakers from power overload, assuming that the proper amperage rating is selected for the circuit. However, an obvious drawback is that a fuse must be replaced once it is blown. U.S. Pat. No. 3,925,708 to Picciochi (1975) demonstrates secondary fuse protection, if his circuit fails. But, if the fuse blows in Picciochi's circuit, the entire audio system is rendered inoperative. Fuse replacement becomes a nuisance and is very costly in audio loudspeakers that are mounted in remote or inaccessible areas.

A relay can easily burn out when a fault surpasses the circuit's trigger point. There is no known prior art available which would avoid this issue. Other prior art involving the use of relays have employed reed-type relays, Queen (1978). However, the contacts in these types of relays have low current-handling capability. This leads to high resistance when high current is passed through the contacts. As a result, voltage drops across the contacts (which reduces power transfer to the loudspeaker), thereby disrupting tonal characteristics. The problem is exacerbated when the audio signal passing through the contacts has high frequency characteristics. Modern power amplifiers easily surpass two kilowatts of output power capability. Also, prior art has not shown any reliable form of contact-arcing suppression. During disconnection, arc suppression allows a clean break. Lack of arc suppression causes an audible "ripping" effect when driven by audio program material. Furthermore, coil heating characteristics are of concern when using relays. As a relay coil's temperature rises, the coil resistance rises, thereby reducing magnetic field intensity. When this occurs, disconnection speed is reduced. Prior patents have not produced a solution to this issue.

Recently, speaker protection has been attempted with a special thermistor commonly called a "positive thermal conductor" (hereinafter referred to as a "PTC"). PTC's are made from a conductive polymer material. PTC's are used for over-current faults in general electronic circuits. The PTC is a device that is like a resistor which changes to a high resistance when its current rating is surpassed. However, this type of thermistor requires approximately one hour to cool down and restabilize to its initial resistance. The PTC cannot protect a loudspeaker from transient damage. PTCs have poor audio characteristics and effect audio quality. U.S. Pat. No. 4,093,822 to Steinle (1978) demonstrates a typical audio protection circuit using a PTC. PTC's are slow in reacting to overload conditions due to a thermistor's inherent operating characteristics. In practice, these devices offer the least overall protection. Thermistors also have amperage limitations, and have not been commercially manufactured for high-power applications.

Other Deficiencies Common to Prior Art

All of the foregoing prior art mentioned, fail to provide broad adjustability of protection ranges for differing audio system power requirements. This author believes a good power protection range should be about 25–1400 continuous watts at 8 ohms, (14–106 volts). Several protection circuits that were found in prior art, would self destruct when approaching higher power levels.

Most prior art found, use filter capacitors as an inherent part of the triggering detection circuitry. With this method, audio program material is rectified into direct current, and then filtered using a capacitor. When filtered in this manner, the circuit creates time delay with response to any fault in an audio system. This method is inadequate to handle fast transient quashing and is further affected by frequency. The affect of frequency on mentioned circuitry, also create differences in capacitor charge time, resulting in disconnection lag time. U.S. Pat. No. 4,122,507 to Queen (1978) expands on the fact that optimum performance was only attained at certain frequencies. This type of circuitry also draws high idle current during normal operation that has been found unacceptable to audio system installers by this authors personal experience.

Other prior art require external wires to be connected to both the loudspeaker and power amplifier. This type of circuit makes installation within a loudspeaker cabinet impractical and expensive. This is especially true in professional or commercial audio systems. U.S. Pat. No. 3,959,735 to Grosjean (1976) demonstrates such a circuit. Still other prior art requires a power supply. An example of this is U.S. Pat. No. 4,330,686 (Roe).

Objects and Advantages

My circuit is a two-stage loudspeaker protection system. The advantages of this circuit are numerous. The first stage of my circuit contains an adjustable threshold detection feature that does not utilize capacitors. In addition, trigger response time can be as fast as 65 nanoseconds. This is much faster than the time in which a fuse could blow open. No prior art found has this transient quashing speed.

Furthermore, the threshold detection point can be adjusted from 14 to 106 volts without modification of any components or values. Further broadening of power adjustment ranges for future situations can easily be attained by changing component values. My circuit's voltage threshold trigger point is adjusted by calculating the square root of the speaker's power rating, multiplied by its impedance. Audio transducers with a specific power rating are protected beyond the calculated maximum power handling figure. Triggering occurs irrespective of an audio signal's frequency, pulse width, quadrant, or rise time.

The first stage also contains high-speed transient quashing capability. This feature protects relay contacts from damage by suppressing arcs during the circuit's second stage of operation. This allows higher-flowing currents to be disconnected, extending relay contact life. Relay contacts are especially susceptible to pitting damage when high frequencies pass through them. The quashing circuitry allows for a clean disconnection between the amplifier and loudspeaker with virtual elimination of relay contact chatter.

The second stage of my circuit contains a high voltage, high-speed relay coil regulator used to illiminate coil burn. Coil burn out is caused by normal over voltage conditions generated by the audio signal when a fault occurs. The regulator guarantees fast mechanical disconnection when the second stage of protection energizes. Mechanical disconnection remains consistent, irrespective of low or high audio signal level, rectified program material, transients, or direct current. The circuit can be easily configured to allow for different relay coil voltages. Guaranteed disconnection speeds range from 14 down to 6 milliseconds, following the transient protection stage. Since prior art does not allow relay coil voltages to broadly adapt well to high or low input amplitudes, disconnection speeds are inconsistent.

My circuit uses no external power supply or battery. It powers itself by using a very small percentage of the audio signal. The circuit also draws no significant power from the audio system during idle operation. Worst case constant idle current draw using 20 khz sine wave, 106 volts, is about 3 milliamps. Using actual audio program material, current draw is in the microamp range, and approaches zero. This non-invasive load on any given audio system alleviates users concerns regarding sound quality. The design is self-sufficient when installed in remote locations, and in loudspeaker cabinets. It responds very fast- to high-powered transients, and offers no loss of dynamic range or frequency response.

The circuit comprises of a transient quashing stage, and a disconnect stage, 1 and 2 respectively. If the applied transient is less than 6–14 milliseconds, disconnection (stage 2) does not occur, yet the transient will be clamped, allowing near-transparent audio program interruption. During stage 1, transients are shunted across a two ohm resistor for a short period of time. No damage to the power amplifier occurs because of this short time period. Often, commercial audio systems are left on overnight, or continuously unmanned where a power amplifier could fail. Since my circuit has the ability to protect an audio system as well as itself, the chance of fire breaking out is further reduced as compared to prior art.

REFERENCE NUMERALS FOR FIG. 1

BR1, BR2—Four hundred volt fast recovery rectifier.
C1—220 uF, 160V Capacitor
D1—1N4744A Zener Diode
D2—T1—¾ Light Emitting Diode (Optional)
Q1—Q2—VN2010L Mosfet
Q3—2SK952 Mosfet
R1—158 k-ohms, ¼ w, 1%
R2—1.24 k-ohms ¼ w, 1%
R3—4.7 k-ohms 2 w, 5%
R4, R9—22 ohms, ¼ w, 5%
R5—2 ohms, 5 w, 10X surge rating, 10%
R6—100 k-ohms, ¼ w, 5%
R7—150 k-ohms, ¼ w, 5%
R8—9.1 ohms, ¼ w, 5%
R10—1 k-ohm, ¼ w, 5% (optional)
TRI—Q2008L4, Thyristor
Y1—DPDT, 2 Form C, 12 VDC, 10 Amp Relay

SUMMARY OF INVENTION

This circuit protects all audio-type transducers, specifically loudspeakers and crossovers, from damage caused by high-powered negative or positive transients, power overload, and direct current. It features complete audio protection, irrespective of frequency. The circuit offers virtually no impedance load during normal operation. There is no loss in dynamic range or frequency response. Additionally, optional visual indication of transients or continuous faults are also featured. Two-stage operation allows transients to be quashed with no disconnection. The first stage has the characteristics of near- transparent sound interruption. No external power supplies or batteries are needed to operate the circuit. It activates by using a very small percentage of power from the incoming audio signal.

DETAILED DESCRIPTION OF THE INVENTION

Figure 1:
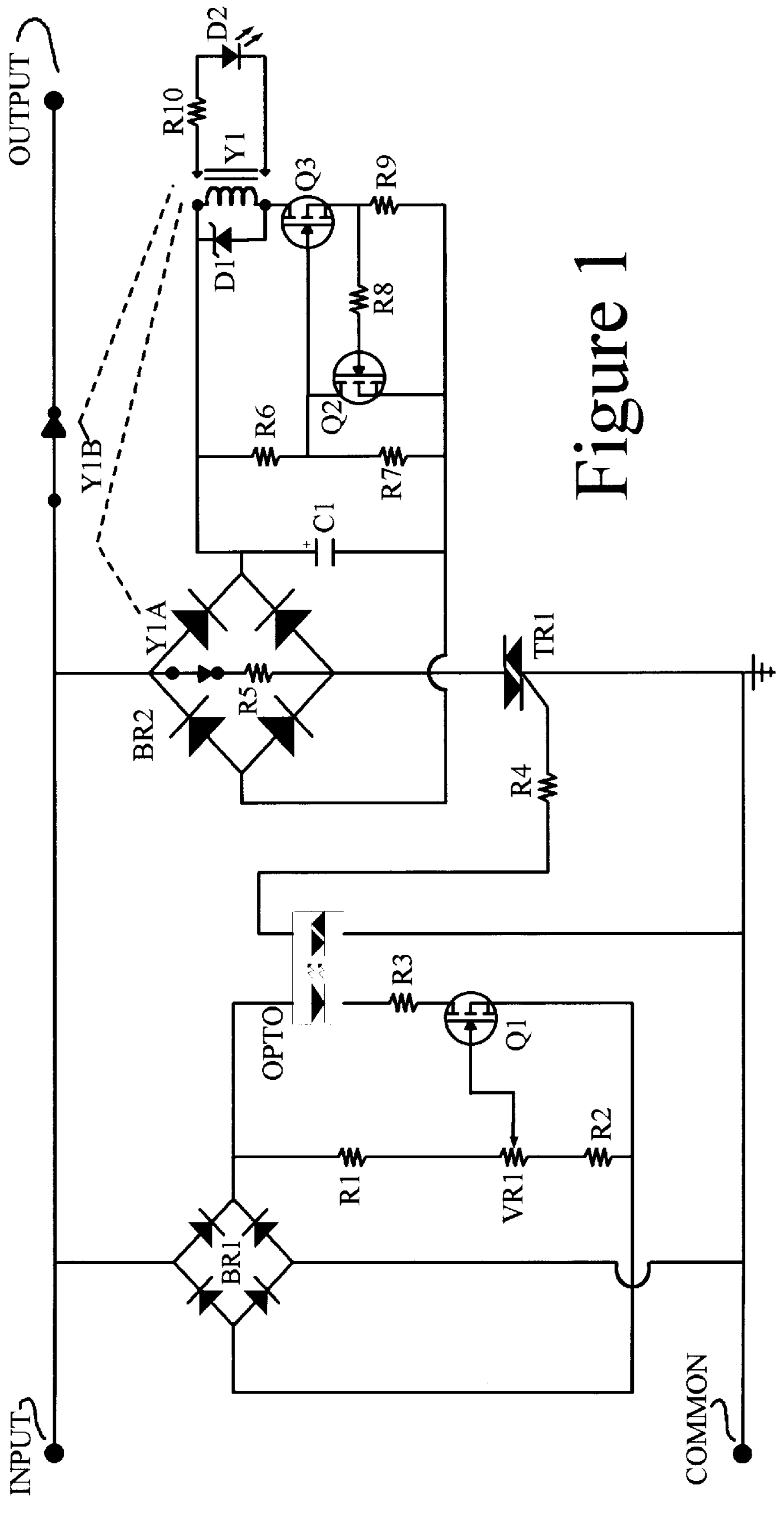
FIG. 1 shows the final schematic circuit of the adjustable loudspeaker protector.

FIG. 1 shows the schematic diagram of the loudspeaker protector circuit. The alternating current side of bridge rectifier, BR1, BR2, and relay contact Y1A, Y1B is connected to the main INPUT bus line. The positive output terminal from a power amplifier connects to the circuit point marked INPUT. The opposing side of BR1, and one side of the thyristor on OPTO is connected to the main GROUND bus point. One side of thyristor TR1 is also connected to this point. The point marked GROUND is also common to power amplifier and loudspeaker negative terminals. The positive side of BR1 connects to a high resistance voltage divider network denoted as R1, VR1, and R2. A variable resistor, VR1 taps into the voltage divider, of which the wiper is connected to the gate of mosfet Q1. The drain of Q1 is connected to current limiting resistor R3, and then in series with the light emitting diode cathode portion of OPTO. The thyristor portion of OPTO connects to gate current limiting resistor, R4. R4 connects to the gate of shunting thyristor TR1. The opposite side of thyristor TR1, connects to opposite side of BR2 and to one side of R5. The other side of R5 connects to one of the normally closed relay contacts Y1A. The positive side of BR2 is connected to positive lead of filter capacitor C1. From this point, a minimum bias voltage divider circuit made up of resistors R6 and R7 is in parallel with C1. The center tap of R6 and R7 is connected to the drain of mosfet Q2, and the gate of a third mosfet Q3. The source of Q2 is connected to the negative side of BR2. Safety voltage zener diode regulator, D1 is in parallel with relay coil Y1. One side of relay coil Y1 is connected to the positive output side of BR2, and R6, and C1. The other side of relay coil Y1 is connected to the drain on Q3. Regulation point resistors R8 and R9 connect to the gate on Q2, and to the negative side of BR2. The other side of R8 and R9 are common to the source on Q3. Optional light emitting diode, D2 is connected in series with R10. D2 and R10 together are in parallel with the relay coil Y1. R10 is an L.E.D. current regulating resistor.

Main Embodiment—Voltage Threshold Detect Circuit

My circuit begins operation by constant monitoring of audio program material fed into a fast recovery bridge rectifier, BR1. BR1 rectifies any signal, whether audio program material, direct current, alternating current, positive or negative non-repetitive transient pulses. It transforms these signals into a peak voltage. A voltage divider network consisting of two resistors: R1, R2, and variable resistor, VR1 allows sufficient gate driving voltage. VR1 allows a user to adjust the voltage trigger point, by changing gate drive to Q1 as required by the system. When VR1 is adjusted to the voltage threshold point, Q1 biases, thereby making the drain and source go into a state of conduction. The light emitting diode portion of the opto-triac, OPTO become energized, thereby firing its own internal thyristor. Current to the light emitting diode portion of the opto-triac is limited by resistor, R3 abling it to handle high voltages safely.

Operation, Dynamic Description—Transient Quashing Circuit, Phase 1

Referring to FIG. 1, once the thyristor portion of OPTO conducts, it very quickly triggers the shunting thyristor, TR1. Gate current to shunting thyristor, TR1 is limited by resistor R4. The thyristor portion of OPTO and thyristor TR1 have a very sharp turn on knee when triggered. This allows high speed transients to be quashed instantaneously, as fast as 65 nanoseconds. The speed of clamping is much faster than audio transients, which have a maximum speed of 25 microseconds, based on 20 Khz sine wave. When TR1 is triggered, which is possible in all four quadrants, it goes into a state of conduction, thereby shunting the signal through relay contact, Y1A and surge resistor R5. This absorbs most of the program material driving a loudspeaker. This technique clamps or "crow bars" the signal from the power amplifier. During this first phase of transient clamping, the amplifier will see an impedance approaching a near shorting condition. Total shunting impedance will be approximately a two ohm load in parallel with whatever the loudspeaker load is, plus the series impedance of the loudspeaker cable. The speaker cable also acts somewhat as a shunting resistor, during the crow barring stage. The load is not an absolute short circuit, and remains this way until the relay contacts open, which is no more than 14 milliseconds in duration. This eliminates the chance of damaging the power amplifier, yet is low enough to quash transients. If the fault were only long enough to enact the first phase, but not the second, TR1 would instantly open up when the transient collapses. This causes it to fall back into its "monitoring" state again. The shunting circuit must handle approximately 14 milliseconds of peak shunting current; in the case of my circuit, 52 amps maximum at 106 volts input. These figures can be easily modified by changing circuit component values.

High Speed-High Voltage Current Regulator

As the signal is being shunted, a voltage develops across R5 and BR2. Voltage is quickly applied to Y1's coil current regulator circuit, which will be at high voltage relative to the relay coils rating. The coil driving circuit has the ability to regulate current through relay coil Y1, from low to high voltages at very high speeds. This eliminates the possibility of coil burn out, regardless of any voltage signal input level.

Disconnect Circuit, Phase 2

Once relay Y1 disconnects the loudspeaker, transient clamping, previously described as phase 1, has already occurred and passed. Assuming the incoming program material may still be in an active fault state, rectified direct current from BR2 and C1, is now routed to the high-speed, high-voltage relay driving circuit with R5 out of the circuit. No shunting occurs at this point, and the circuit has begun its second phase. The only current being drawn from the power amplifier is the relay coil driving circuit used to hold the contacts of Y1 open. This second phase occurs when a fault is longer than about six to fourteen milliseconds, relative to the signals crest factor. The relay will be held open indefinitely until audio program material has dropped below the threshold voltage level. This occurs once the signal gain is removed or reduced at the amplifier. When this occurs, the relay will instantly reconnect to its normally closed position, restoring program material to the loudspeaker.

Since the relay coil has a high speed, high voltage variable current regulation circuit driving it, mechanical disconnection speed remains consistent. This is regardless of audio signal input level, and allows disconnection from approximately 6 to 14 milliseconds. Relay Y1 is of 2 form C configuration.

The optional light emitting diode D2, is driven by the voltage across relay coil Y1. When a fast transient "spikes" the second stage, Y1's contact may not open, though thyristor TR1 goes into a state of conduction, as previously explained. This transient will be fast enough to flash on D2, indicating to the user that a transient has occurred. During a continuous fault, D2 will remain on, indicating a systemic problem warning the user to turn down the volume, or shut down the audio system.

Contact Protection

As relay, Y1A and Y1B break contact from both the loudspeaker and shunting circuit, arcing across both relay contacts are significantly reduced. At the same time, the power amplifier sees a short duration low resistance load that is disappearing. After this short period, which is the first phase of transient protection, total disconnection of the speaker from the power amplifier occurs. This only is the case when the transients are very powerful or longer than about 6 to 14 milliseconds in duration. By protecting the contacts in this manner, a clean disconnecting action occurs between the amplifier and loudspeaker, plus virtual elimination of relay contact chatter.

Operation of Alternative Version of Invention

Figure 2:
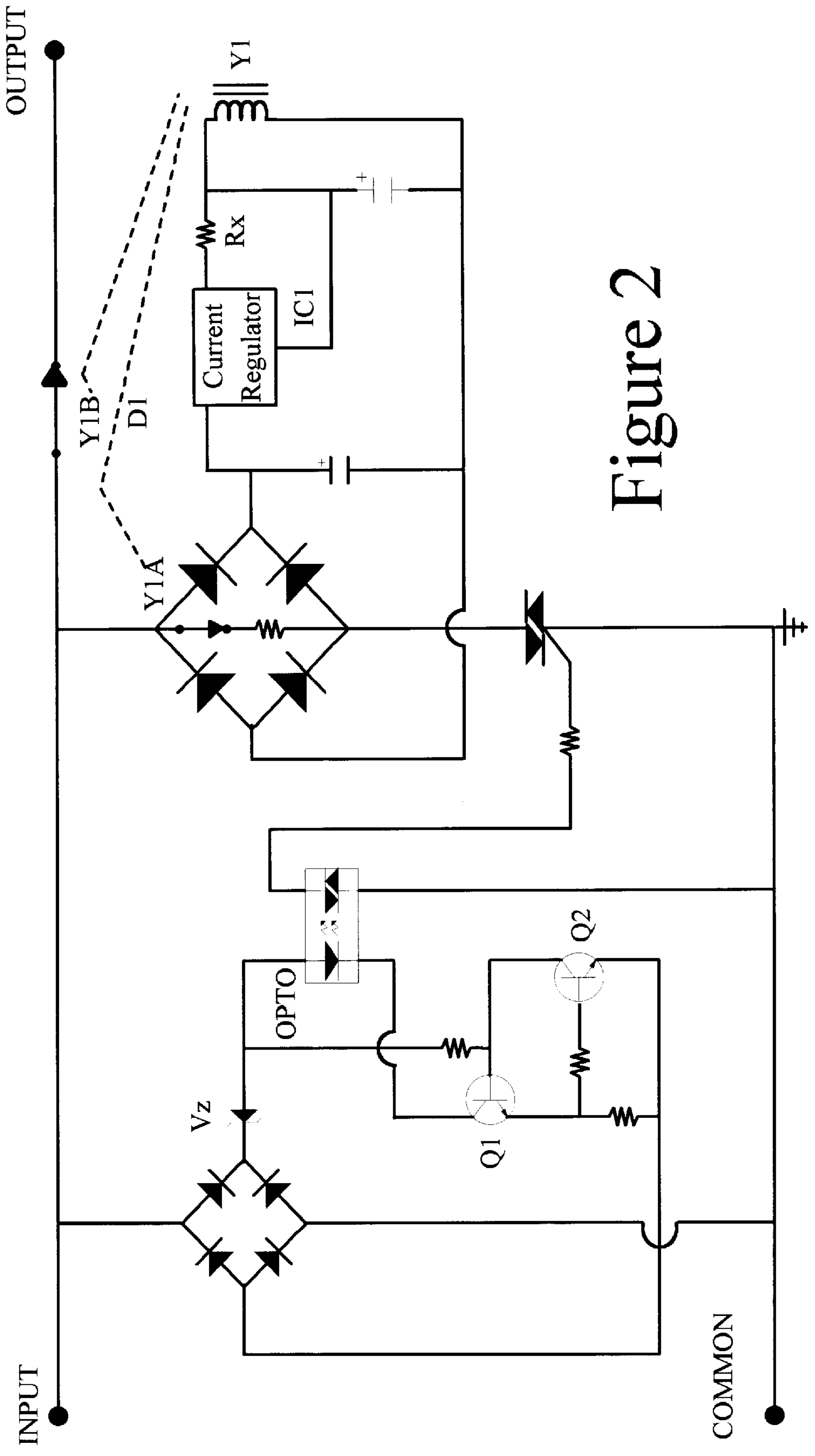
FIG. 2 shows the original circuit with power limitations and not user adjustable.

FIG. 2 shows the schematic diagram of my original speaker protection circuit. This circuit, has the disadvantage of power protection limitation, and no adjustability for its threshold voltage trigger point. Differing power requirements, are accomplished by changing component values according to the audio systems requirements. Transistors Q1, and Q2 are used to regulate current through the light emitting diode portion of OPTO. This method has not proven to have linear triggering characteristics, but still a very useful speaker protection circuit. Various hard set trigger points are achieved by using zener diodes with different voltages, Vz. Use of a commercially available integrated circuit regulator (IC1) to control the current through the relay coil is limited. This is due to the unavailability of high power handling devices. Diode, D1 acts as an emergency safety bypass to protect IC1 from damage, however relay coil, Y1 still sees high voltage that could damage it. Higher voltage relay coils can be used in conjunction with Rx, being the current calibration resistor, but becomes impractical for adjustable audio power system requirements.

At the time of this writing, high-voltage regulators have become available and can suffice in the regulation portion of the circuit. Optional coil regulation methods would be to use an N-channel depleted mosfet, or any other semiconductor device(s) configured for current regulation of the relay coil, Y1.

Optional triggering methods can be accomplished by using operational amplifiers, transistors, or any configuration of high impedance semiconductors, configured for voltage level detection.

Response Graph

Figure 3:
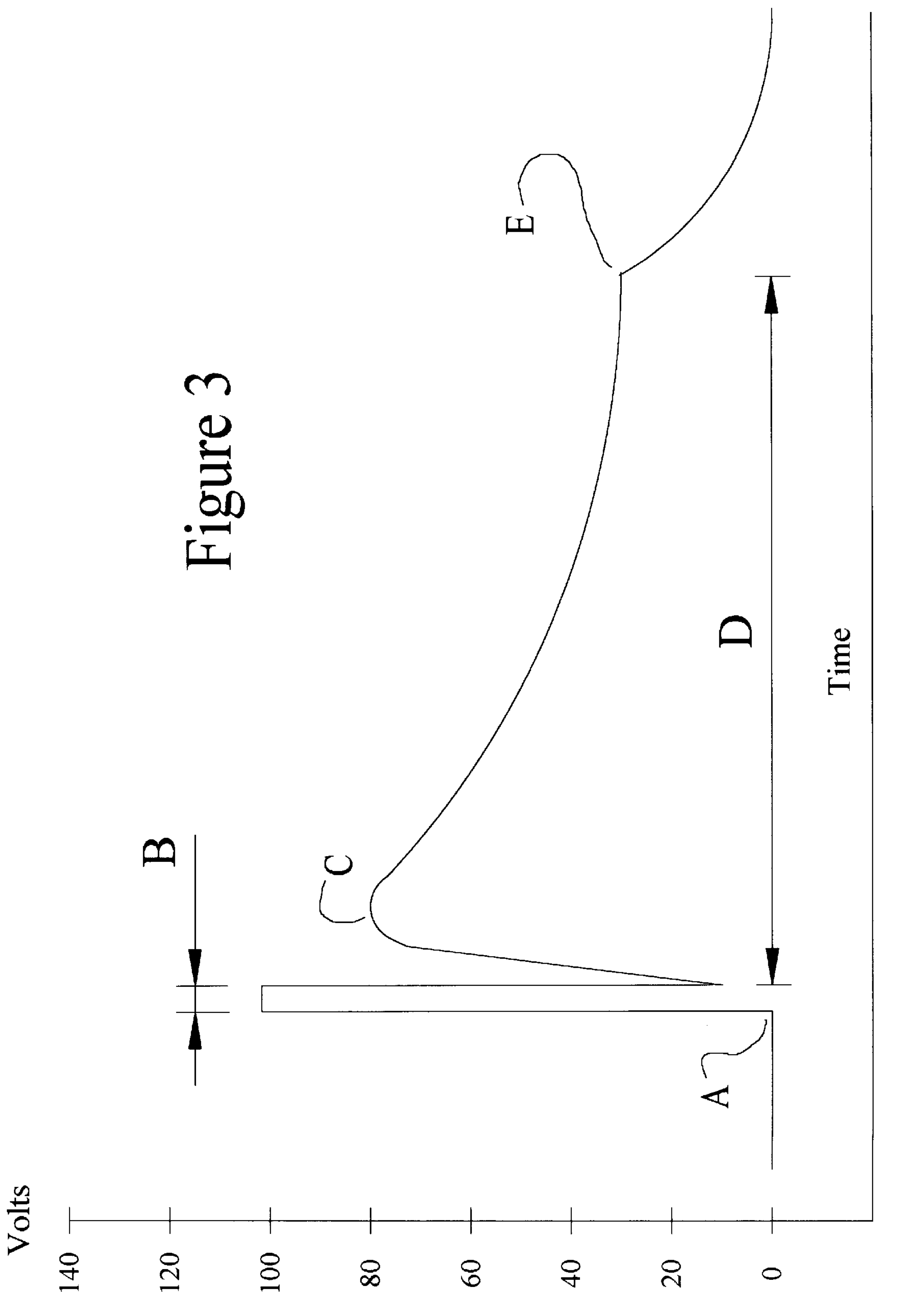
FIG. 3 displays a graph that demonstrates circuit reaction with a direct current pulse applied to the circuit.
Figure 4A:
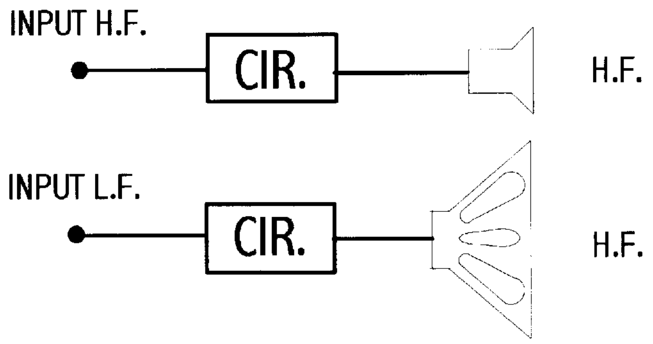
FIGS. 4A–4D, show typical systemic wiring configurations in block diagram form.
Figure 4B:
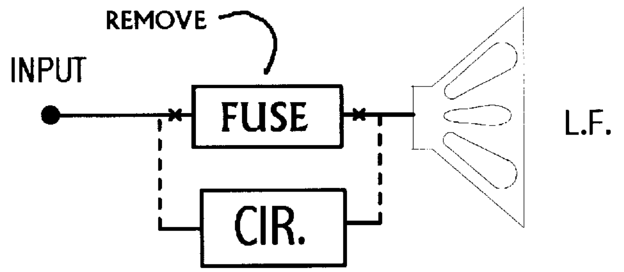
Figure 4C:
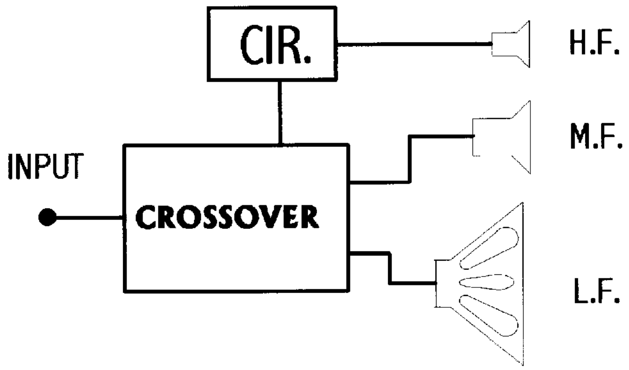
Figure 4D:
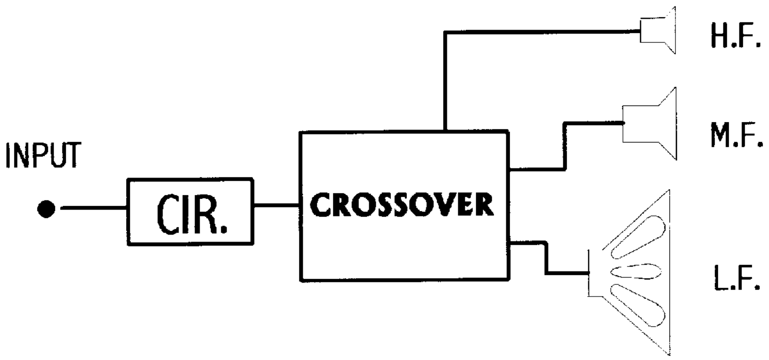

FIG. 3 shows a graph of my circuit's performance. Point "A" is where a capacitavely charged test pulse was applied to the circuit. For circuit understandability, a test capacitor was utilized, and charged to 102 volts using direct current. Point "B" shows the length in time that quashing occurs. This stage occurs for about 65 nanoseconds. Once a transient has clamped a fault to a near zero condition, voltage drop is forced across R5, (point "C"). Stage 2 prepares for disconnection. Point "D" shows how long before disconnection occurs. Under normal operating circumstances, clamping and disconnection time average anywhere from 65–265 nanoseconds, and 6–14 milliseconds respectively. Once time has reached point E, the loudspeaker has disconnected resulting in total system protection. Audio program material recovers within 1 second after disconnection, provided the fault is not continuous.

If a transient applied at point "A" had a short duration, (<6 milliseconds), point C, D and E would not exist on the graph. As a transient is applied and quashed, stage 1 reverts into its "monitoring" idle state after the transient disappears. This allows for near transparent interruption of transients, thrust upon a loudspeaker.

System Configurations—Block Diagrams

FIG. 4 shows four different types of configurations for my protection circuit. Many others are possible, and are up to the user. The common wire is not shown for ease of clarity. FIG. 4A shows a system configuration known as bi-amplification. Two of my circuits are required since there are two separate power amplifiers in this type of configuration. One power amplifier takes care of the high frequency portion of the system, and the other power amplifier takes care of the low frequency portion. FIG. 4B demonstrates my circuit directly replacing a loudspeaker fuse. The fuse is removed and the circuit is substituted in its place. FIG. 4C shows a protection configuration for high frequency drivers only. The advantage of this setup is when transients are applied to the system, only the high frequency driver is disconnected and nothing else. The listener only looses high frequency response during a fault, further establishing near transparent interruption of program material. FIG. 4D shows complete protection of the system including the crossover and all drivers ahead of it. When disconnection occurs in this configuration, audio is completely cut off, (except for quashed transients). The advantage of 4D, is that complete system protection is achieved including protection of the crossover. Resetting occurs instantaneously.

Conclusions, Ramifications and Scope of Invention

As previously described, my circuit provides complete protection of loudspeakers and all other audio transducers in a very reliable and efficient manner. It protects from damage caused by continuous power overload, direct current, and high speed transients. The circuit is small, making it suitable for installation inside loudspeaker cabinets. It uses no external power source or batteries. My circuit requires the splicing of only three wires. As a result, the installation of my circuit is easy and quick, and can be done within 15 minutes. Different configurations of installing the circuit are easily accomplished, allowing a great deal of installation flexibility. This flexibility allows a user to configure the system for the protection of loudspeaker clusters, with a choice of including a crossover, or any specific driver within a speaker cabinet. The broad range of voltage triggering adjustments allow protection of speaker cabinets and systems with different power ratings and impedances. Any existing loudspeaker cabinet or system can be retrofitted with this circuit.

While my description contains many specifities, these should not be construed as limitations on the scope of the invention, but rather as an exemplification of one preferred embodiment thereof Many other variations are possible. For example: other uses of this circuit can be for the protection of A.C. line connected equipment. My circuit will protect equipment from damage caused by transients, and overvoltage situations. Referring to FIG. 1, triggering point is easily hard set by eliminating VR1 and calibrating the values of R1 and R2 to the desired power level. My circuit would be useful in the protection of digital electronic equipment, such as computers or microprocessor based equipment. Accordingly, the scope of the invention should be determined not by the embodiment(s) illustrated, but by the appended claims and their legal equivalents.

I claim:

1. A non-invasive, two-stage, high-speed, loudspeaker protector, comprising:

a) a first stage for quashing transients which comprises a gate-triggered thyristor transient clamping means having adjusting means for accommodating a wide range of signal input amplitude overload conditions, signal type, signal duration and signal polarity; wherein, said first stage performs near inaudible quashing of repetitive and non-repetitive, high powered transients, with no disconnection between input and output, prior to opening a relay contact, and includes means for significant arc reduction across said relay contact;

b) a second stage, following said first stage, for completely disconnecting an attached loudspeaker or transducer, comprising complete loudspeaker disconnection means, said disconnection means comprises coil means and coil current regulation means for protecting the coil means from coil burn-out, for reducing electrical fire hazard to any transducer and its associated components connected to said output and for maintaining optimum mechanical disconnection time between said input and said output in response to said input signal;

said protector further comprising reliable means of visual indication for any overload condition, of said input signal, without requiring alteration of circuit components; and, said protector, further comprising two fast-recovery bridge rectifiers, wherein said rectifiers comprise means for short-circuit condition elimination, during high speed commutation of said input signal through said bridge rectifiers, wherein, any connected loudspeakers or transducers are further protected against any input signal irrespective of polarity and the dynamic range and frequency response characteristics of any connected audio system is not affected.

* * * * *